United States Patent [19]

Kato et al.

[11] 4,078,447

[45] Mar. 14, 1978

[54] FLOOR CONTROL SHIFT LEVER MECHANISM IN AUTOMATIC TRANSMISSION OF MOTOR VEHICLE

[75] Inventors: Hiroshi Kato; Kiyoshi Tazaki, both of Toyoda, Japan

[73] Assignee: Toyota Jidosha Kogyo Kabushiki Kaisha, Toyota, Japan

[21] Appl. No.: 717,457

[22] Filed: Aug. 24, 1976

[30] Foreign Application Priority Data

Oct. 29, 1975  Japan .................... 50/147208[U]

[51] Int. Cl.² ............................................. G05G 5/18
[52] U.S. Cl. ........................................ 74/475; 74/538
[58] Field of Search ................. 74/473 R, 475, 476, 74/535, 537, 538

[56] References Cited

U.S. PATENT DOCUMENTS

| | | | |
|---|---|---|---|
| 2,248,364 | 7/1941 | Leach | 74/535 X |
| 2,918,829 | 12/1959 | Piercy | 74/538 |
| 3,583,184 | 6/1971 | Papale | 74/473 X |
| 3,597,992 | 8/1971 | Lowry | 74/476 |
| 3,998,109 | 12/1976 | O'Brien | 74/538 X |

*Primary Examiner*—Allan D. Herrmann
*Attorney, Agent, or Firm*—Stevens, Davis, Miller & Mosher

[57] ABSTRACT

An improved floor control shift lever mechanism in an automatic transmission of a motor vehicle, more particularly, an improved mechanism for moving up and down a detent rod so as to effect shifting of a shift lever and maintain its shifted condition. The detent rod is inserted in a cylindrical shift lever and axially reciprocates therein, and this detent rod is constantly drawn downward by means of a compression spring. The detent rod is provided with a pin at the upper end thereof. A hollow shift lever knob is attached to the upper end of the shift lever and a knob button is slidably inserted in the shift lever knob. One end of the knob button is protruded from the shift lever knob and another end of the knob button is pressed by a compression spring furnished within the shift lever knob. Between the knob button and the detent rod, there is provided means for joining the knob button to the detent rod. When the knob button is pushed inward, the detent rod is pulled up and simultaneously the lowermost edge of the detent rod is released from the engagement with a detent plate positioned thereunder and the shift lever becomes rotatable. When the knob button is released, the detent rod goes down and the lowermost edge of the detent rod is placed at a desired position on the detent plate.

12 Claims, 6 Drawing Figures

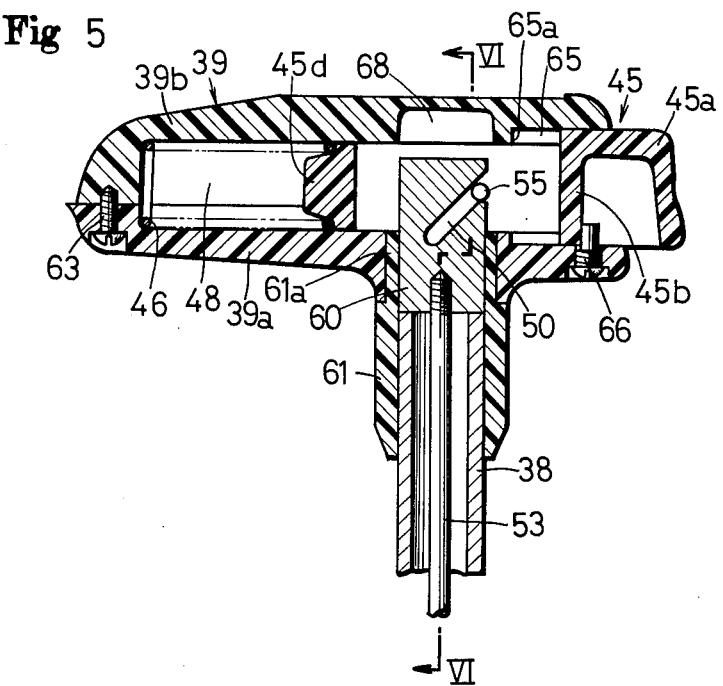
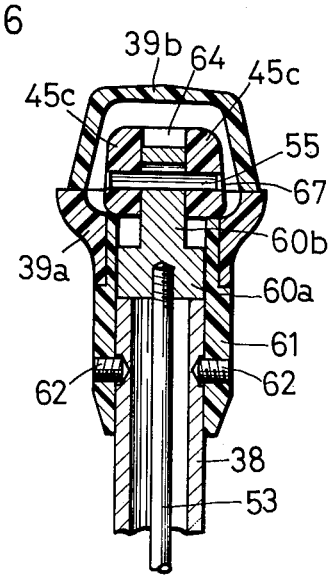

FLOOR CONTROL SHIFT LEVER MECHANISM IN AUTOMATIC TRANSMISSION OF MOTOR VEHICLE

BACKGROUND OF THE INVENTION

This invention relates to an improvement in a floor control shift lever for use in an automatic transmission of a motor vehicle.

Hitherto, there is already known a floor control shift lever of this kind. In the known mechanism, a shift lever knob is attached to the upper end of the shift lever, and a knob button is slidably inserted in a blind hole provided to the shift lever knob. By pushing the knob button in the direction across the axial direction of the shift lever, a detent rod inserted in the shift lever is moved down against the function of a spring so as to release a stop pin radially projected from the detent rod from the engagement with a pre-shifted position on a detent plate and shift it to another desired position. However, the construction of the mechanism relative to the detent rod, the stop pin and the detent plate is complicated, since the release from the engagement between the stop pin and the detent plate must be done by pushing down the detent rod, while the engagement therebetween is to be maintained by the function of the spring pressing the detent rod upward. Especially, it is difficult to align the axis of the detent rod with the detent plate. Therefore, a space is inevitably required between the detent rod and the detent plate. Accordingly, the stress is concentrated on the engagement points between the stop pin projected from the detent rod and the detent plate, and inevitably, those points must be enough strengthened.

SUMMARY OF THE INVENTION

It is accordingly a principal object of the present invention to provide a floor control shift lever mechanism which is simple in construction and is easily assembled, wherein a detent rod is pulled up by pushing a knob button in the direction across the axial directions of the shift lever and the detent rod is moved down by releasing the knob button.

It is another object of the present invention to provide a durable floor control shift lever mechanism, wherein the axis of a detent rod joins with the central surface of a detent plate so that the stress given to the engagement points between the detent rod and the detent plate can be minimized.

It is a further object of the present invention to provide a floor control shift lever mechanism which does not occur any collision noise by a detent rod and the detent plate on the occasion of shifting a shift lever.

These and other objects and features of the present invention will be clear from a reading of the following description of the disclosure found in the accompanying drawings and the novelty thereof pointed out in the appended claims.

BRIEF DESCRIPTION OF THE DRAWINGS

FIG. 5 is a side elevational view in section of an alternate embodiment of the invention; and FIG. 6 is a vertical sectional view taken along the line VI—VI of FIG. 5.

DESCRIPTION OF THE PREFERRED EMBODIMENTS

Figure 1:
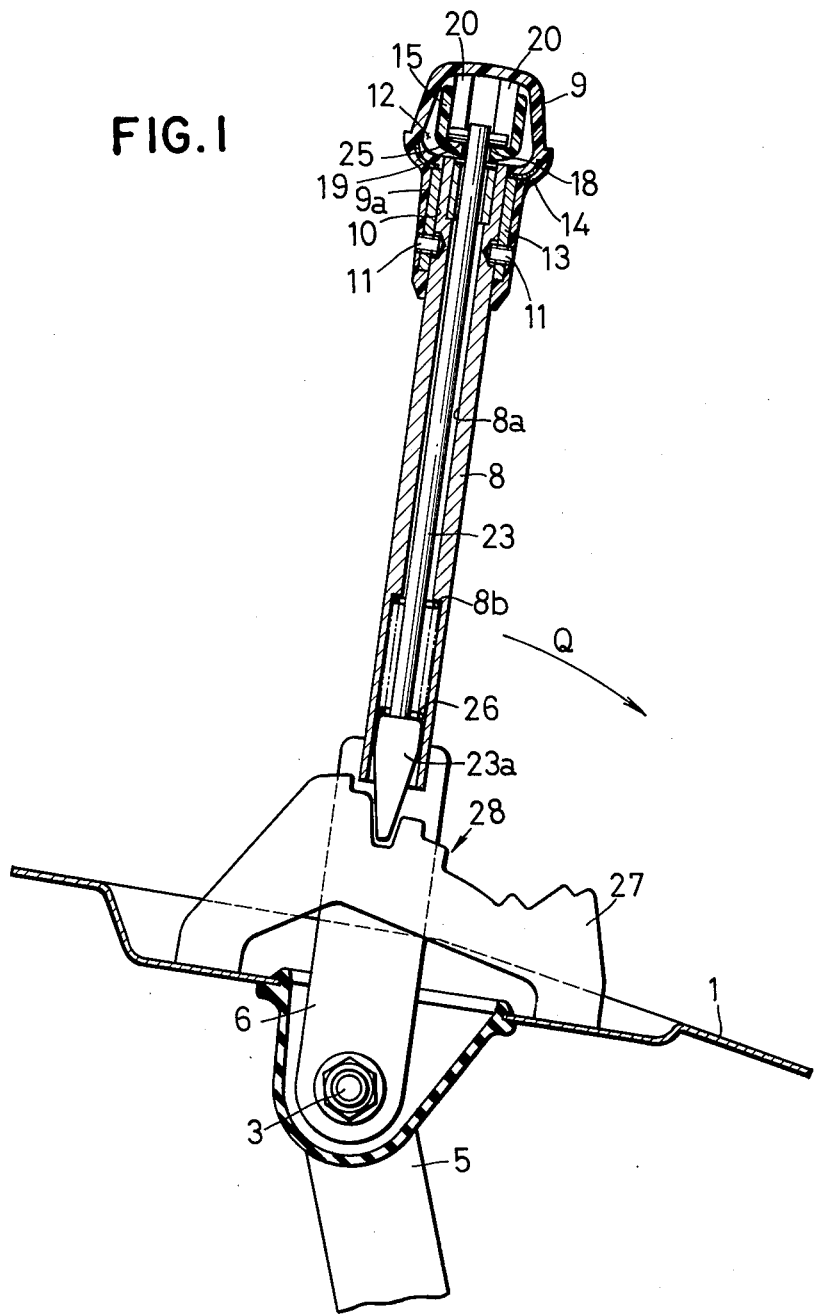
FIG. 1 is an elevational view in section of a floor control shift lever embodying the present invention.

Referring now to the embodiment of the invention shown in FIGS. 1-4, reference numeral 1 indicates a shift lever plate under which a cylindrical retainer 2 is fixed. The retainer 2 internally forms a hole 2a into which a control shaft 3 is rotatably fitted by means of a couple of bushes 4 and 4. There is fixed a control shaft lever 5 to one end of the control shaft 3 by welding etc., and an arm 6 is fixed to the other end of the control shaft 3 by means of double nuts 7, 7 through a washer 7a. The upper end portion of the arm 6 is fixed to the lower end portion of a cylindrical shift lever 8 by welding etc. A substantially T-shaped shift lever knob 9 made of synthetic resin or the like is attached to the upper end of the shift lever 8. The shift lever knob 9 is provided with a boss portion 9a having a circular slit 10 which engages with the upper end of the shift lever 8. A grip portion 9b of the shift lever knob 9 is arranged to be at right angles to the shift lever's pivoting direction and is fixed to the shift lever 8 with screws 11. In the grip portion 9b of the shift lever knob 9, there is provided a blind hole 12 substantially trapezoidally shaped in section. The blind hole 12 is opened at one side and is joined to the slit 10 in the boss portion 9a of the shift lever knob 9. There is arranged a metallic pipe 13 in the slit 10 of the boss portion 9a and there is arranged a metal reinforcement 14 at the joint of the boss portion 9a and the grip portion 9b. The metallic pipe 13 and the metal reinforcement 14 are united together by welding or in any other appropriate way so as to obtain a desired strength at the joint of the boss portion 9a and the grip portion 9b.

Figure 2:
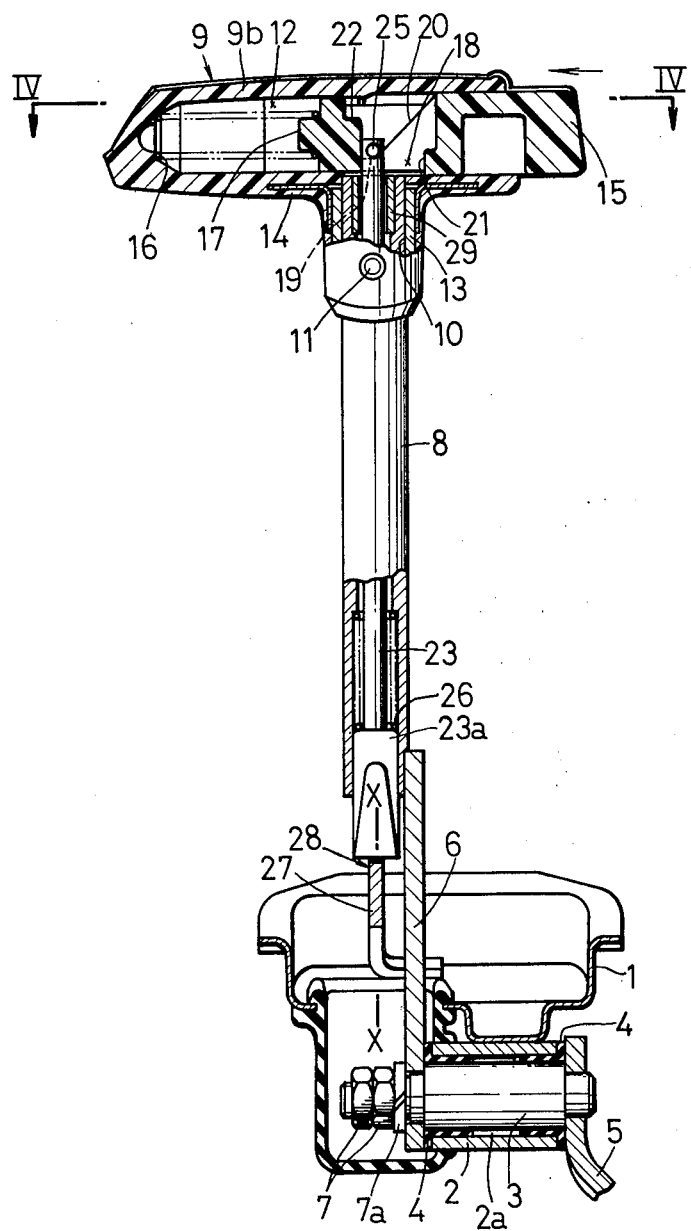
FIG. 2 is a side elevational view in section of the shift lever viewed from the right-hand side in FIG. 1.
Figure 3:
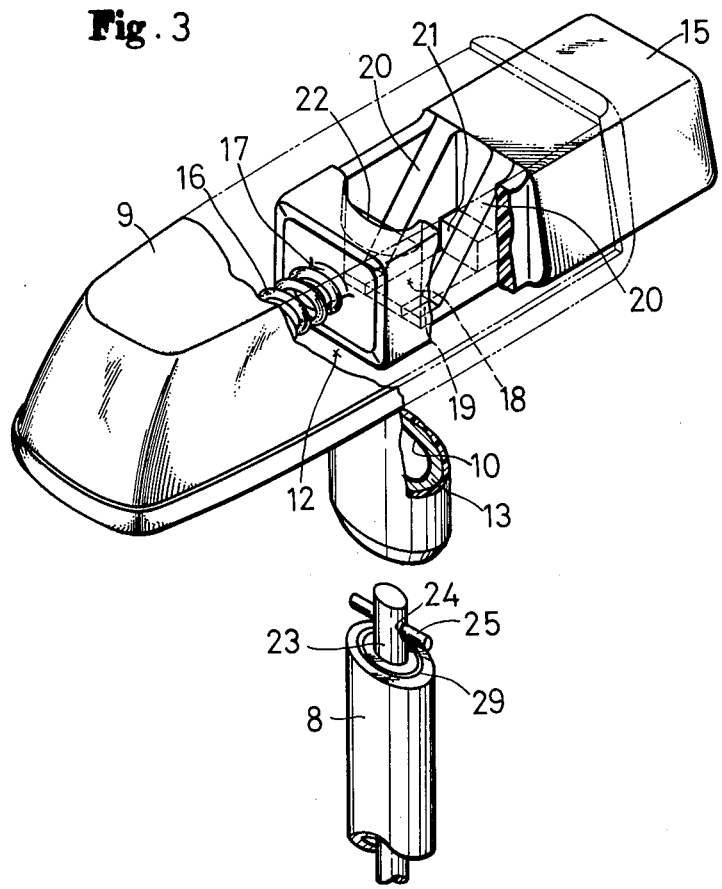
FIG. 3 is a partially broken and partially exploded perspective view of the essential parts of the shift lever.
Figure 4:
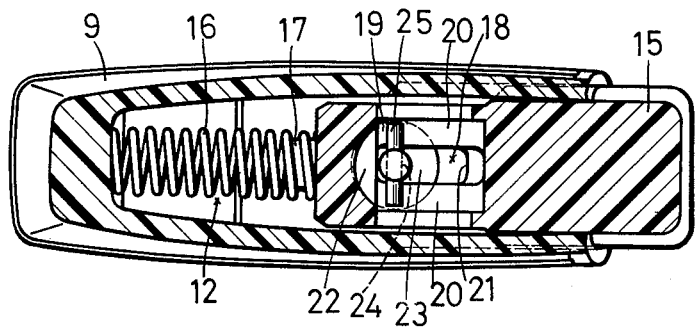
FIG. 4 is an enlarged sectional view taken along the line IV—IV of FIG. 2.

Within the blind hole 12 of the shift lever knob 9 there is provided a knob button 15 which is made of synthetic resin or the like and is slidably moved by means of a return spring 16 positioned in the inner side of the blind hole 12. As shown in FIGS. 2-4, the knob button 15 has a projection 17 for supporting the return spring 16. About at the middle of the knob button 15, there is formed an inclined rectangular slot 18 of a fixed length (a little longer than the length of a pin 25 of a detent rod 23 which will be described hereinafter). Along both sides of the slot 18, there are formed a pair of inclined rails 20, 20 in parallel, each of which has a flat support 19 at the lower part thereof. The knob button 15 is solidly provided with a stopper portion 21 which is positioned at the right-hand side in the slot 18 in FIGS. 2-4. Further, the knob button 15 is formed with a notch 22 in the shape of circular arc which is positioned above the flat supports 19 and is joined to the slot 18 so as to allow the pin 25, which will be described hereinafter, to rotate.

The shift lever 8 is provided with an inner bore 8a into which a detent rod 23 is slidably fitted. The upper end of the detent rod 23 is protruded above the inclined rails 20, 20 along the rectangular slot 18 of the knob button 15 and the upper end of the detent rod 23 is provided with a pinhole 24 into which a pin 25 is inserted. The pin 25 is crossly engaged with the upper surfaces of the inclined rails 20, 20. When the knob button 15 is inwardly pushed, the pin 25 moves upward along the inclined rails 20, 20, accordingly, the detent rod 23 is pulled up. The upward movement of the detent rod 23 is restricted by the stopper portion 21 of the knob button 15 which is pressed against the exterior surface of the detent rod 23. While, the knob button 15 is prevented from being slipped out of the blind hole 12 of the shift lever knob 9 by the contact of the exterior surface of the detent rod 23 and the innermost edge of the knob button 15. On this occasion, the outer end of the knob button 15 is protruded from the blind hole 12 and such a condition of the knob button 15 is maintained by the function of the return spring 16 (See FIG. 2). Meanwhile, the detent rod 23 is forced to be pushed downward by means of a compression spring 26 furnished between the lower part 23a of the detent rod 23 and the stepped portion 8b formed in the inner bore 8a of the shift lever 8. The lowermost edge of the lower part 23a of the detent rod 23 is protruded from the inner bore 8a and is engaged with concavo-convex surface 28 formed on the detent plate 27 mounted on the shift lever plate 1. In this case, as the pin 25 of the detent rod 23 is held on the supports 19 of the inclined rails 20 of the knob button 15, the lowermost edge of the lower part 23a of the detent rod 23 is constantly engaged with the concavo-convex surface 28 including parking, neutral, "D" and "2" ranges in a slightly raised condition, and the longitudinal axis of the detent rod 23 is aligned with the center line X—X of the detent plate 27. In the meantime, there is provided a nylon bush or the like 29 to the detent rod supporting portion at the upper end of the shift lever 8.

Now, the description will be made as to the operation of the floor control shift lever mechanism as constructed above. Suppose the shift lever 8 is shifted to the parking position in the detent plate 27 as shown in FIG. 1. The pin 25 at the upper end of the detent rod 23 being downwardly pushed by the function of the compression spring 26 is held on the supports 19 of the inclined rails 20. When the knob button 15 is pushed in the direction of an arrow in FIG. 2 against the function of the return spring 16, the pin 25 of the detent rod 23 moves upward along the inclined rails 20, acordingly the detent rod 23 is pulled up against the function of the compression spring 26. Then, the lowermost edge of the lower part 23a of the detent rod 23 is pulled out of the concavity for the parking position of the concavo-convex surface 28 formed on the detent plate 27. The upward movement of the detent rod 23 is stopped, as the stopper portion 21 of the knob button 15 is pressed against the exterior surface of the detent rod 23. Under these conditions, the shift lever 8 is rotated with the control shaft 3 supported by the retainer 2 being as the pivot in the direction of an arrow Q in FIG. 1, so that the shift lever 8 can be shifted to a desired position. Simultaneously with the shifting operation of the shift lever 8, the control lever 5 is also rotated with the control shaft 3 being as the pivot, so that a manual valve is changed over by means of a control rod (not shown) and the known velocity change of the automatic transmission is carried out. After the shifting operation of the shift lever 8 as mentioned above, the knob button 15 is released. Then, the knob button 15 is returned where it was by the function of the return spring 16 and simultaneously the pin 25 of the detent rod 23 is downwardly moved along the inclined rails 20, accordingly the detent rod 23 is pulled down by the function of the compression spring 26. Thus, the lowermost edge of the lower part 23a of the detent rod 23 is engaged with the desired position on the concavo-convex surface 28 of the detent plate 27. The lowermost edge of the lower part 23a of the detent rod 23 is released from and engaged with the concavo-convex surface 28 of the detent plate 27 by pulling the detent rod 23 up and down for the purpose of preventing the shift lever 8 from being shifted to the wrong positions such as, for instance, the parking position or the reverse range.

In the floor control shift lever mechanism thus constructed and operated, the shift lever 8, the shift lever knob 9, the knob button 15 and the detent rod 23 are assembled as follows. First, the knob button 15 is inserted into the blind hole 12 of the shift lever knob 9 together with the return spring 16. On this occasion, the rectangular slot 18 of the knob button 15 is joined with the circular slit 10 of the shift lever knob 9. Then, the detent rod 23 assembled within the inner bore 8a of the shift lever 8 beforehand is pushed up so as to insert the upper end of the detent rod 23 into the rectangular slot 18 of the the knob button 15, and the pin 25 provided to the upper end of the detent rod 23 is also inserted into the rectangular slot 18. Under these conditions, the shift lever 8 is fitted in the circular slit 10 of the shift lever knob 9. Then, the pin 25 is positioned at the notch 22 provided to the knob button 15 so as to allow the shift lever knob 9 to rotate, and after that, the shift lever knob 9 is rotated at 90° in relation to the shift lever 8, so that the pin 25 is settled on the inclined rails 20 of the knob button 15 and the grip portion 9b of the shift lever knob 9 is set to be at right angles to the shift lever's pivoting direction. Then, the shift lever 8 is fixed to the shift lever knob 9 by means of the screws 11. Such an assembling work is not complicated at all and it is quite easily carried out. Further, it is also quite easy to take it apart to pieces by raising the detent rod 23 and rotating the shift lever knob 8 at 90° in the opposite direction to the above-mentioned direction.

Furthermore, in this embodiment of the invention, on the occasion of shifting the shift lever 8 to each position of the parking, neutral, driving and second on the concavo-convex surface 28 of the detent plate 27, the pin 25 of the detent rod 23 is supported by the supports 19 of the inclined rails 20 of the knob button 15. Therefore, despite of being pushed downward by the function of the compression spring 26, the lowermost edge of the lower part 23a of the detent rod 23 is maintained in a condition of being slightly raised from the concavo-convex surface 28. Accordingly, the generation of collision noise by the lowermost edge of the detent rod 23 and the detent plate 27 is completely prevented.

FIGS. 5 and 6 show an another embodiment of this invention. In this second embodiment, a shift lever is indicated by reference numeral 38 and the upper portion of this shift lever 38 is fixed to a cylindrically-shaped knob fixing member 61 by means of screws 62. There is provided a stepped portion 61a to the exterior surface of the upper part of the member 61, and to this stepped portion 61a a lower body 39a of the shift lever knob 39 is fitted. The lower body 39a of the shift lever knob 39 is fixed to an upper body 39b of the shift lever knob 39 by means of a screw 63. There is inserted a detent rod 53 in the shift lever 38 in the same manner as the first embodiment of this invention, and a member 60 in the shape of inverted T in section comprising a lower disk portion 60a and an upper upright portion 60b is screwed to the upper end of the detent rod 53. The upper upright portion 60b of the member 60 is provided with an inclined groove 50. The member 60 can be moved up and down within the knob fixing member 61. Reference numeral 45 indicates a knob button. In the knob button 45, there is formed a space 64 surrounded by a pair of side walls 45c, 45c, an inner wall 45b of a protruded portion 45a of the knob button 45 and a return spring supporting portion 45d. Each of the side walls 45c, 45c of the knob button 45 is provided with a pinhole 67 into which a pin 55 is fitted. The pin 55 is engaged with the inclined groove 50 of the upright portion 60b of the member 60. Between the lower body 39a and the upper body 39b of the shift lever knob 39, there is formed a lateral slit 48 into which the knob button 45 is inserted and slidable therein. In the lateral slit 48 there is provided a concavity 68 which receives the upper end of the member 60 when it is moved up. An the slit 48 is steppedly expanded at the outer part thereof and this expanded section is indicated by reference numeral 65. There is formed a shoulder portion 65a at the inner end of the expanded section 65. Therefore, the protruded portion 45a of the knob button 45 can be moved within the range of the expanded section 65 of the slit 48 and when the knob button 45 is pushed in, the inner wall 45b of the protruded portion 45a of the knob button 45 is contacted with the shoulder portion 65a of the expanded section 65, so that an excessive inward movement of the knob button 45 is prevented. Reference numeral 66 indicates a stopper attached to the lower body 39a of the shift lever knob 39 and this stopper 66 prevents the knob button 45 from slipping out of the slit 48. Numeral 46 indicates a return spring which is put in the slit 48 and supported by the return spring supporting portion 45d of the knob button 45. This return spring 46 constantly pushes the knob button 45 in the outward direction.

In operation of this embodiment, as the knob button 45 is inwardly pushed, the pin 55 goes deeper into the inclined groove 50 of the upright portion 60b of the member 60. Accordingly, the member 60 is upwardly moved and the detent rod 53 also is upwardly moved, so that the lowermost edge of the detent rod 53 is released from the concavo-convex surface 28 of the detent plate 27 shown in FIG. 1. Therefore, the shift lever 38 becomes rotatable with the control shaft 3 being as the pivot. Then, the knob button 45 is released and is returned where it was by the function of the return spring 45, accordingly the detent rod 53 is pulled down by the function of the compression spring 26. Thus, the lowermost edge of the detent rod 53 is settled at the desired position on the concavo-convex surface 28 of the detent plate 27, and the shift lever 38 is prevented from further rotating.

In this embodiment, the shift lever 38 and the shift lever knob 39 are assembled in the following manner. First, the member 60 is placed on the upper end of the shift lever 38, and the upper end of the detent rod 53 is screwed to the under surface of the member 60. Next, the knob fixing member 61 to which the lower body 39a of the shift lever knob 39 is attached is fitted around the disk portion 60a of the member 60 and the shift lever 38. Then, the knob button 45 is placed on the lower body 39a of the shift lever knob 39. On this occasion, the upright portion 60b of the member 60 is inserted into the space 64 of the knob button 45, and the return spring 46 is also placed on the lower body 39a of the shift lever knob 39. Then, the knob button 45 and the return spring 46 are covered with the upper body 39b of the shift lever knob 39, and the upper body 39b is fixed to the lower body 39a by means of a screw 63. After that, the knob button 45 is pushed so as to engage the pin 55 with the inclined groove 50 of the member 60, and the stopper 66 is attached to the lower body 39a of the shift lever 39. Finally, the knob fixing member 61 is fixed to the shift lever 38 by means of the screws 62.

Although the invention has been disclosed with reference to preferred embodiments thereof, it should be understood that modifications or variations can easily be made by those skilled in the art without departing from the scope of the invention which is defined by the appended claims.

What we claim is:

1. A floor control shift lever mechanism in an automatic transmission of a motor vehicle comprising a cylindrical shift lever, a detent rod positioned within said shift lever and axially movable therein, a shift lever knob attached to the upper end of said shift lever, said shift lever knob having a blind hole, a knob button slidably positioned within said blind hole of said shift lever knob, a pin transversely mounted to the upper end of said detent rod, a pair of inclined guide rails provided on said knob button along which said pin moves, means for constantly pressing said knob button in an outwardly direction from said blind hole of said shift lever knob, and means for drawing down said detent rod, wherein said detent rod is pulled upwardly by pushing said knob button inwardly so that said detent rod is released from the engagement with a detent plate located thereunder and said detent rod is drawn down by releasing said knob button to retain it where it was so that said detent rod is engaged with said detent plate.

2. The floor control shift lever mechanism according to claim 1 wherein said pin is loosely inserted in a pin hole provided in the upper end of said detent rod.

3. The floor control shift lever mechanism according to claim 1, wherein the upward movement of said detent rod is restricted by a stop portion provided in said knob button to be pressed against the exterior surface of said detent rod.

4. The floor control shift lever mechanism according to claim 1, wherein the upper portion of said detent rod is inserted between said pair of inclined guide rails and said pin is projected from both said surfaces of said detent rod.

5. A floor control shift lever mechanism according to claim 4, wherein said knob button is provided therein with a space of enough width for preventing said pin from contacting with the inner surface of said knob button when said shift lever knob is rotated so as to set said shift lever knob to said shift lever under the conditions that said knob button is inserted in said shift lever knob and said pin mounted to the upper end of said detent rod is situated in said knob button.

6. The floor control shift lever mechanism according to claim 5, wherein a notch is provided in that upper wall portion of said knob button which is adapted to engage with said detent rod.

7. The floor control shift lever mechanism according to claim 1, wherein said pair of inclined guide rails have horizontal flat portions at the lower sides thereof.

8. The floor control shift lever mechanism according to claim 7, wherein said flat portions are so designed that the lowermost edge of the lower part of said detent rod is engaged with the concavo-convex surface formed on said detent plate including a certain shift range in a slightly raised condition.

9. The floor control shift lever mechanism according to claim 8, wherein the lowermost edge of the lower part of said detent rod is constantly engaged with the concavo-convex surface of said detent plate including parking, neutral, "D" and "2" ranges in a slightly raised condition.

10. A floor control shift lever mechanism in an automatic transmission of a motor vehicle comprising a cylindrical shift lever, a detent rod, positioned within said shift lever and axially movable therein, a shift lever knob attached to the upper end of said shift lever, said shift lever knob having a lateral slit, a knob button which is slidably positioned within said lateral slit of said shift lever knob, a pin transversely secured to the said knob button, a member attached to the upper end of said detent rod having an inclined groove in which said pin rides and which guides said pin, means for constantly pressing said knob button in an outwardly direction from said lateral slit of said shift lever knob, and means for drawing down said detent rod, wherein said detent rod is pulled upwardly by pushing said knob button inwardly so that said detent rod is released from the engagement with a detent plate located thereunder and said detent rod is drawn down by releasing said knob button to retain it where it was so that said detent rod is engaged with said detent plate.

11. A floor control shift lever mechanism according to claim 10, wherein said pin is secured across a space defined by the side walls of said knob button and said member having said inclined groove is inserted in said space so as to engage with said pin.

12. A floor control shift lever mechanism according to claim 11, wherein a concavity is provided in said lateral slit of said shift lever knob in a position opposite to said member to receive the upper end of said member when said member is moved upwardly.

* * * * *